US008990696B2

(12) United States Patent
McConnell

(10) Patent No.: US 8,990,696 B2
(45) Date of Patent: Mar. 24, 2015

(54) GEOGRAPHICAL VULNERABILITY MITGATION RESPONSE MAPPING SYSTEM

(75) Inventor: James Trent McConnell, Keller, TX (US)

(73) Assignee: Verizon Corporate Services Group Inc., Basking Ridge, NJ (US)

( * ) Notice: Subject to any disclaimer, the term of this patent is extended or adjusted under 35 U.S.C. 154(b) by 762 days.

(21) Appl. No.: 12/975,595

(22) Filed: Dec. 22, 2010

(65) Prior Publication Data

US 2011/0093786 A1  Apr. 21, 2011

Related U.S. Application Data

(63) Continuation of application No. 10/916,872, filed on Aug. 12, 2004, now Pat. No. 8,082,506.

(51) Int. Cl.
| | |
|---|---|
| G06F 3/048 | (2013.01) |
| G06F 15/177 | (2006.01) |
| H04L 12/64 | (2006.01) |
| H04L 12/24 | (2006.01) |
| H04L 29/06 | (2006.01) |
| H04L 29/12 | (2006.01) |

(52) U.S. Cl.
CPC ............ H04L 12/6418 (2013.01); H04L 41/12 (2013.01); H04L 63/1408 (2013.01); H04L 63/1433 (2013.01); *H04L 29/12028* (2013.01); *H04L 61/103* (2013.01)
USPC ............................ 715/736; 715/734; 709/233

(58) Field of Classification Search
CPC .............. H04L 41/12; G06F 17/30241; G06F 17/3087; G06F 2211/005
USPC .................................... 715/736, 734; 709/233
See application file for complete search history.

(56) References Cited

U.S. PATENT DOCUMENTS

| | | | |
|---|---|---|---|
| 4,729,737 | A | 3/1988 | Reagan et al. |
| 5,515,285 | A | 5/1996 | Garrett et al. |
| 5,781,704 | A | 7/1998 | Rossmo |
| 5,848,373 | A | 12/1998 | DeLorme et al. |
| 5,940,598 | A | 8/1999 | Strauss et al. |
| 6,088,804 | A * | 7/2000 | Hill et al. ........................ 726/25 |
| 6,163,604 | A | 12/2000 | Baulier et al. |
| 6,240,360 | B1 * | 5/2001 | Phelan ........................ 701/438 |
| 6,377,987 | B1 | 4/2002 | Kracht |
| 6,430,274 | B1 | 8/2002 | Winstead et al. |
| 6,456,306 | B1 | 9/2002 | Chin et al. |

(Continued)

FOREIGN PATENT DOCUMENTS

WO     2005/076135     8/2005

OTHER PUBLICATIONS

Brown, at al., "Crime Mapping for Computer Crimes," Department of Systems Engineering, University of Virginia, pp. 1-6, Jun. 9, 2000.

(Continued)

*Primary Examiner* — David Phantana Angkool

(57) ABSTRACT

Systems and methods for geographically mapping a vulnerability of a network having one or more network points include receiving vulnerability information identifying a vulnerability of a point of the network, correlating the vulnerability information with location information for the identified network point, and network identification information for the identified network point, and generating a map displaying a geographical location of the vulnerability.

21 Claims, 9 Drawing Sheets

(56) References Cited

U.S. PATENT DOCUMENTS

| | | |
|---|---|---|
| 6,456,852 B2 | 9/2002 | Bar et al. |
| 6,633,230 B2 | 10/2003 | Grandin et al. |
| 6,691,161 B1 | 2/2004 | Cook et al. |
| 6,691,256 B1 | 2/2004 | Cook et al. |
| 6,813,777 B1 | 11/2004 | Weinberger et al. |
| 6,816,090 B2 | 11/2004 | Teckchandani et al. |
| 6,832,247 B1 | 12/2004 | Cochran et al. |
| 6,839,852 B1 | 1/2005 | Pantuso et al. |
| 6,900,822 B2 | 5/2005 | Germain et al. |
| 6,917,288 B2 * | 7/2005 | Kimmel et al. ............... 340/511 |
| 6,941,359 B1 | 9/2005 | Beaudoin et al. |
| 7,031,728 B2 | 4/2006 | Beyer |
| 7,082,535 B1 | 7/2006 | Norman et al. |
| 7,096,498 B2 | 8/2006 | Judge |
| 7,146,568 B2 | 12/2006 | Richardson |
| 7,227,950 B2 | 6/2007 | Faith et al. |
| 7,243,008 B2 | 7/2007 | Stockdale et al. |
| 7,260,844 B1 * | 8/2007 | Tidwell et al. ................ 726/22 |
| 7,269,796 B1 | 9/2007 | Bayes et al. |
| 7,272,648 B2 | 9/2007 | Kawasaki et al. |
| 7,272,795 B2 | 9/2007 | Garding et al. |
| 7,337,222 B1 | 2/2008 | Du et al. |
| 7,337,408 B2 | 2/2008 | DeLuca et al. |
| 7,342,581 B2 | 3/2008 | Vinberg |
| 7,349,982 B2 | 3/2008 | Hannum et al. |
| 7,418,733 B2 | 8/2008 | Connary et al. |
| 7,609,156 B2 | 10/2009 | Mullen |
| 8,015,604 B1 * | 9/2011 | Tidwell et al. ................ 726/22 |
| 8,082,506 B1 * | 12/2011 | McConnell ................. 715/736 |
| 8,091,130 B1 * | 1/2012 | McConnell ..................... 726/23 |
| 8,171,555 B2 * | 5/2012 | D'Mello et al. ................ 726/25 |
| 8,201,257 B1 * | 6/2012 | Andres et al. .................. 726/25 |
| 8,352,739 B2 | 1/2013 | Park et al. |
| 8,359,343 B2 * | 1/2013 | McConnell ................. 707/899 |
| 8,538,676 B2 * | 9/2013 | Wuersch et al. .............. 701/400 |
| 8,561,175 B2 * | 10/2013 | Williams et al. ................ 726/22 |
| 8,571,580 B2 * | 10/2013 | Altman et al. ............. 455/456.3 |
| 8,590,047 B2 * | 11/2013 | Hoyt et al. ....................... 726/25 |
| 8,615,582 B2 * | 12/2013 | McClure et al. .............. 709/224 |
| 8,620,344 B2 * | 12/2013 | Huang et al. ............... 455/456.1 |
| 8,634,860 B2 * | 1/2014 | Huang et al. ............... 455/456.6 |
| 8,655,371 B2 * | 2/2014 | Huang ........................ 455/456.1 |
| 8,711,698 B2 * | 4/2014 | Cohen et al. .................. 370/236 |
| 8,719,198 B2 * | 5/2014 | Zheng et al. .................... 706/21 |
| 8,745,090 B2 * | 6/2014 | Caduff .......................... 707/791 |
| 2003/0018769 A1 | 1/2003 | Foulger et al. |
| 2003/0115211 A1 * | 6/2003 | Chen et al. .................... 707/102 |
| 2003/0200347 A1 | 10/2003 | Weitzman |
| 2003/0232598 A1 | 12/2003 | Aljadeff et al. |
| 2004/0003285 A1 | 1/2004 | Whelan et al. |
| 2004/0044912 A1 | 3/2004 | Connary et al. |
| 2004/0117624 A1 | 6/2004 | Brandt et al. |
| 2004/0121787 A1 | 6/2004 | Day et al. |
| 2004/0172466 A1 | 9/2004 | Douglas et al. |
| 2004/0233234 A1 | 11/2004 | Chaudhry et al. |
| 2004/0240297 A1 | 12/2004 | Shimooka et al. |
| 2004/0260945 A1 | 12/2004 | Raikar et al. |
| 2005/0075116 A1 | 4/2005 | Laird et al. |
| 2005/0075119 A1 | 4/2005 | Sheha et al. |
| 2005/0206513 A1 | 9/2005 | Fallon |
| 2006/0004497 A1 | 1/2006 | Bull |
| 2006/0041345 A1 | 2/2006 | Metcalf |
| 2006/0200490 A1 | 9/2006 | Abbiss |
| 2007/0008885 A1 | 1/2007 | Bonner |
| 2007/0038568 A1 | 2/2007 | Greene et al. |
| 2007/0079243 A1 | 4/2007 | Leigh et al. |
| 2007/0204033 A1 | 8/2007 | Bookbinder et al. |
| 2009/0138353 A1 | 5/2009 | Mendelson |
| 2009/0157744 A1 * | 6/2009 | McConnell ................ 707/104.1 |
| 2009/0172773 A1 | 7/2009 | Moore |
| 2009/0249460 A1 | 10/2009 | Fitzgerald et al. |
| 2010/0311386 A1 | 12/2010 | Edge et al. |
| 2011/0016536 A1 | 1/2011 | O'Brien et al. |
| 2011/0099281 A1 | 4/2011 | Bakker et al. |
| 2011/0183644 A1 | 7/2011 | Gupta |
| 2011/0189971 A1 | 8/2011 | Faccin et al. |
| 2011/0195687 A1 | 8/2011 | Das et al. |
| 2012/0252493 A1 | 10/2012 | Siddeley et al. |

OTHER PUBLICATIONS

Clancy, et al, "Security Threats to Signal Classifiers Using Self-Organizing Maps," Department of Electrical and Computer Engineering University of Maryland, Cognitive Radio Oriented Wireless Networks and Communications, CROWNCOM '09, Jun. 22-24, 2009.

Fu, et al, "The Digital Marauder's Map: A New Threat to Location Privacy," 29th IEEE International Conference on Distributed Computing Systems, pp. 589-596. Jun. 22-26, 2009.

* cited by examiner

| Vulnerability Name | Vulnerable IP |
|---|---|
| RPC Bo | 10.1.1.1 |
| SSH Bo | 10.1.1.2 |
| RPC Bo | 10.1.2.1 |
| | |

| IP Address | Router Address |
|---|---|
| 10.1.1.1 | 02-69-8C-01-02-03 |
| 10.1.1.2 | 02-69-8C-01-02-03 |
| 10.1.2.1 | 02-69-8C-01-02-04 |

| Router Logical Address | Router Physical Address | City | State | Zip Code |
|---|---|---|---|---|
| 02-69-8C-01-02-03 | 7979 Beltline Road | Irving | TX | 75039 |
| 02-69-8C-01-02-04 | 2319 E. Fowler Avenue | Tampa | FL | 33612 |

| Vulnerability Name | Vulnerable IP | Address | City | State | ZIP | Status | Assigned to |
|---|---|---|---|---|---|---|---|
| RPC Bo | 10.1.1.1 | 7979 Beltline Road | Irving | TX | 75039 | Fixed | Tom |
| RPC Bo | 10.1.2.1 | 2319 E. Fowler Avenue | Tampa | FL | 33612 | Open | Fred |
| SSH Bo | 10.1.1.2 | 7979 Beltline Road | Irving | TX | 75039 | Fixed | Mary |

GEOGRAPHICAL VULNERABILITY MITGATION RESPONSE MAPPING SYSTEM

This application is a continuation of, and claims the benefit of priority to, application Ser. No. 10/916,872, filed Aug. 12, 2004 now U.S. Pat. No. 8,082,506 (now allowed), which is incorporated herein by reference in its entirety.

FIELD

This invention relates to a system and method to geographically map internal sources of cyber or digital security vulnerabilities in near or post real time for a physically focused mitigation response.

BACKGROUND

When a vulnerability in computer or telecommunications systems is proactively discovered to have a potential impact on an environment, response resources must be directed to a physical location. In practice, this requires extensive efforts to correlate existing threat information, router traffic information and physical location of the router, dramatically reducing response time. For example, today, most responses to a vulnerability require manual review of TCP/IP switch information, manual drawing of network "maps" and, most importantly, trying to mitigate a vulnerability in a sequential or business prioritization order while these efforts are being undertaken. These response schemes do not allow for an organization's management to easily identify the geographical location of the problem(s) and the location(s) at which resources are most needed. Furthermore, current response schemes do not allow an organization's response or management team timely access to geographical view(s) of the location of the vulnerabilities together with information relating to the status or progress of the response to the vulnerability.

SUMMARY

Consistent with the invention, systems and methods for geographically mapping a vulnerability of a network having one or more network points include receiving vulnerability information identifying a vulnerability of a point of the network, correlating the vulnerability information with location information for the identified network point, and network identification information for the identified network point, and generating a map displaying a geographical location of the vulnerability.

Additional objects and advantages will be set forth in part in the description which follows, and in part will be obvious from the description, or may be learned by practice of the invention. The objects and advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 4 is an exemplary screenshot of a vulnerability database containing vulnerability information;

FIG. 5 is an exemplary screenshot of records in an ARP database;

FIG. 6 is an exemplary screenshot of records in a location database;

FIG. 7 is an exemplary screenshot of records in a map database containing information for mapping vulnerabilities;

DESCRIPTION OF THE EMBODIMENTS

Figure 1:
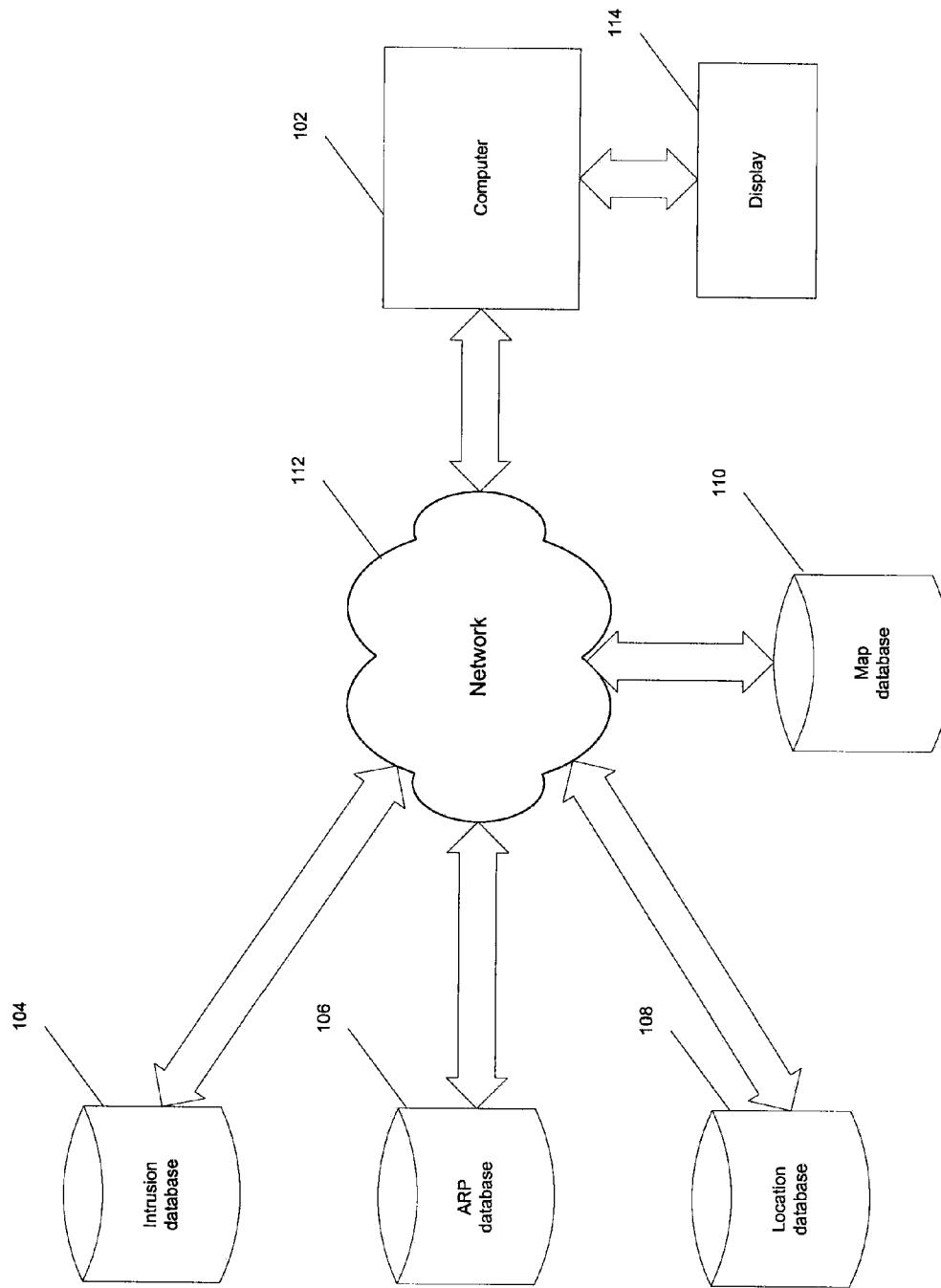
FIG. 1 is a block diagram of an exemplary environment in which the systems and methods of the present invention may be implemented.

Reference will now be made in detail to the exemplary embodiments, examples of which are illustrated in the accompanying drawings. Wherever possible, the same reference numbers will be used throughout the drawings to refer to the same or like parts. It is to be understood that both the foregoing general description and the following detailed description are exemplary and explanatory only and are not restrictive of the invention, as claimed.

As used herein, an "intrusion" is an unauthorized use, attempt, or successful entry into a digital, computerized, or automated system, requiring a response from a human administrator or response team to mitigate any damage or unwanted consequences of the entry. For example, the introduction of a virus and the unauthorized entry into a system by a hacker are each "intrusions" within the spirit of the present invention. An "intrusion response" is a response by administrators or human operators to mitigate damage from the intrusion or prevent future intrusions. One of ordinary skill in the art will recognize that, within the spirit and scope of the present invention, "intrusions" of many types and natures are contemplated.

In addition, as used herein, a "vulnerability" is a prospective intrusion, that is, a location in a digital, computerized, or automated system, at which an unauthorized use, attempt, or successful entry is possible or easier than at other points in the system. For example, a specific weakness may be identified in a particular operating system, such as Microsoft's Windows™ operating system when running less than Service Pack 6. Then, all computers running the Windows operating system with less than Service Pack 6 will therefore have this vulnerability. One of ordinary skill in the art will recognize that this and other vulnerabilities may be identified by commercially available software products. While methods of locating such vulnerabilities are outside the scope of the present invention, one of ordinary skill in the art will recognize that any of the vulnerabilities identified or located by such software products, now known or later developed, are within the spirit of the present invention.

In addition, as used herein, a "mitigation response" is the effort undertaken to reduce unwanted consequences or to eliminate the possibility of a vulnerability or intrusion. For example, such a response may entail sending a human computer administrator to the site of the location to update software, install anti-virus software, eliminate a virus, or perform other necessary tasks. In addition, a response may entail installing a patch to the vulnerable computer, such as across a network. One of ordinary skill in the art will recognize that the present invention does not contemplate any specific responses. Instead, any response to a vulnerability or intrusion requiring the organization of resources is within the scope and spirit of the present invention.

For the ease of discussion, the following discussion will discuss the systems and methods of the present invention in terms of mapping "vulnerabilities". However, these same systems and methods are equally applicable to mapping "intrusions".

FIG. 1 is a block diagram of one exemplary environment in which the systems and methods of the present invention may be implemented. As shown in FIG. 1, system 100 employs mapping computer 102. In addition, system 100 may also employ databases such as vulnerability database 104, Address Routing Protocol (ARP) database 106, location database 108, and map database 110, each in electronic communication with mapping computer 102. System 100 also includes a display 114, such as a video display, for displaying the geographic information correlated and mapped by computer 102 using the methods discussed herein, and a network 112 in electronic communication with computer 102, in which the intrusions and vulnerabilities may occur.

In one embodiment, vulnerability database 104 may contain information identifying a vulnerability in the system, such as, for example, the vulnerability type, description, and impacted device, such as an IP Address of the impacted device (i.e., network point or computer). ARP database 106 may contain network location or identification information such as the IP and/or MAC address for one or more network points representing an impacted device (i.e., network point or computer). Location database 108 may contain geographical information such as the physical address or GPS coordinates of a potential point of entry. Finally, map database 110 may correlate and contain information from the vulnerability, ARP, and location databases as described below to map the vulnerabilities.

Figure 2:
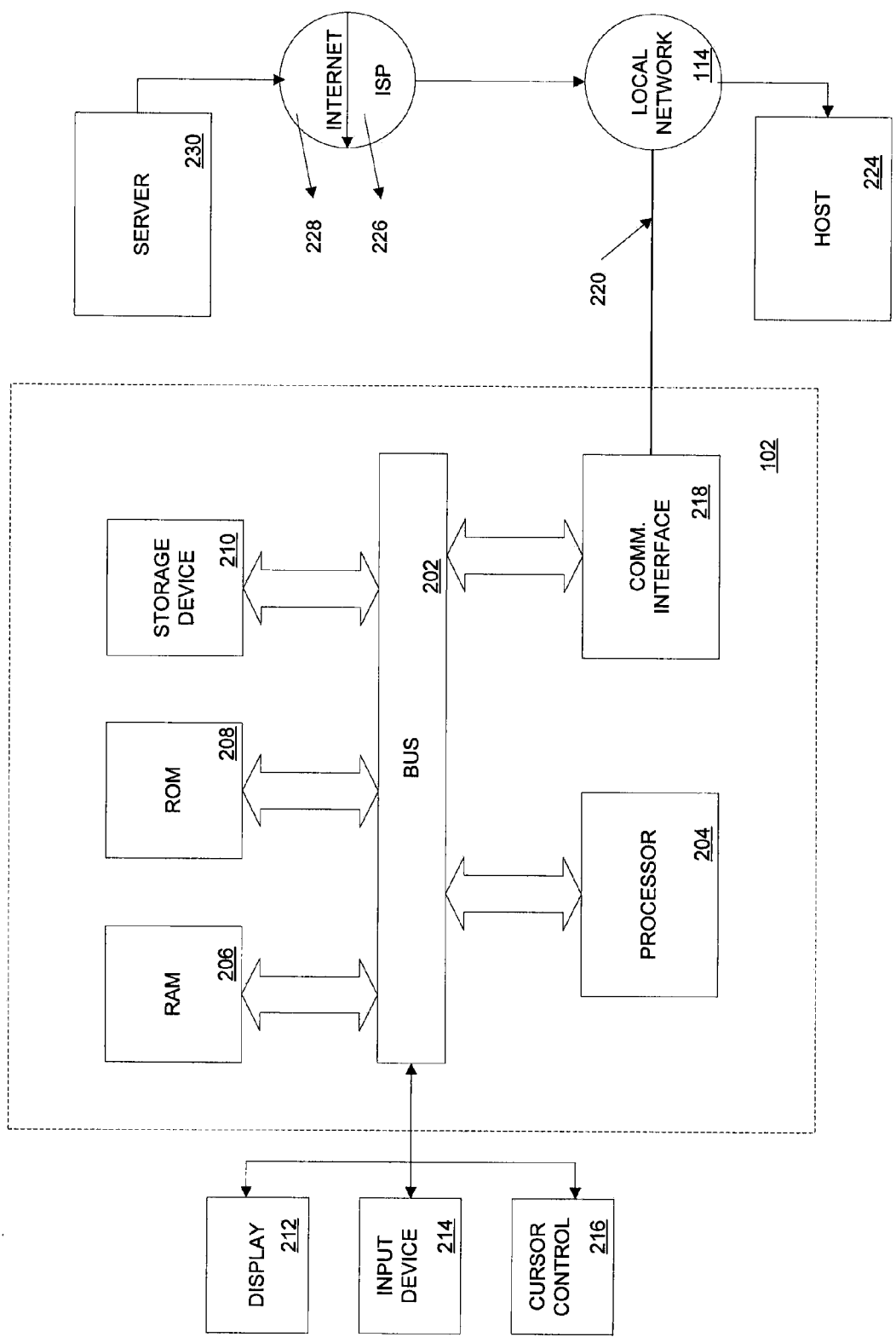
FIG. 2 is a block diagram of an exemplary embodiment of a mapping computer.

FIG. 2 is a block diagram illustrating an exemplary mapping computer 102 for use in system 100, consistent with the present invention. Computer 102 includes a bus 202 or other communication mechanism for communicating information, and a processor 204 coupled to bus 202 for processing information. Computer 102 also includes a main memory, such as a random access memory (RAM) 206, coupled to bus 202 for storing information and instructions during execution by processor 204. RAM 206 also may be used for storing temporary variables or other intermediate information during execution of instructions to be executed by processor 204. Computer system 102 further includes a read only memory (ROM) 208 or other storage device coupled to bus 202 for storing static information and instructions for processor 204. A mass storage device 210, such as a magnetic disk or optical disk, is provided and coupled to bus 202 for storing information and instructions.

Computer 102 may be coupled via bus 202 to a display 212, such as a cathode ray tube (CRT), for displaying information to a computer user. Display 212 may, in one embodiment, operate as display 114.

Computer 102 may further be coupled to an input device 214, such as a keyboard, is coupled to bus 202 for communicating information and command selections to processor 204. Another type of user input device is a cursor control 216, such as a mouse, a trackball or cursor direction keys for communicating direction information and command selections to processor 204 and for controlling cursor movement on display 212. Cursor control 216 typically has two degrees of freedom in two axes, a first axis (e.g., x) and a second axis (e.g., y), which allow the device to specify positions in a plane.

According to one embodiment, computer 102 executes instructions for geographic mapping of vulnerability or intrusion information. Either alone or in combination with another computer system, computer 102 thus permits the geographic mapping of one or more vulnerabilities in response to processor 204 executing one or more sequences of instructions contained in RAM 206. Such instructions may be read into RAM 206 from another computer-readable medium, such as storage device 210. Execution of the sequences of instructions contained in RAM 206 causes processor 204 to perform the functions of mapping computer 102, and/or the process stages described herein. In an alternative implementation, hard-wired circuitry may be used in place of, or in combination with software instructions to implement the invention. Thus, implementations consistent with the principles of the present invention are not limited to any specific combination of hardware circuitry and software.

The term "computer-readable medium" as used herein refers to any media that participates in providing instructions to processor 204 for execution. Such a medium may take many forms, including but not limited to, non-volatile, volatile media, and transmission media. Non-volatile media includes, for example, optical or magnetic disks, such as storage device 210. Volatile media includes dynamic memory, such as RAM 206. Transmission media includes coaxial cables, copper wire and fiber optics, including the wires that comprise bus 202. Transmission media may also take the form of acoustic or light waves, such as those generated during radio-wave and infra-red data communications.

Common forms of computer-readable media include, for example, a floppy disk, flexible disk, hard disk, magnetic tape, or any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer may read. For the purposes of this discussion, carrier waves are the signals which carry the data to and from computer 102.

Various forms of computer-readable media may be involved in carrying one or more sequences of one or more instructions to processor 204 for execution. For example, the instructions may initially be carried on the magnetic disk of a remote computer. The remote computer may load the instructions into a dynamic memory and send the instructions over a telephone line using a modem. A modem local to computer 102 may receive the data on the telephone line and use an infra-red transmitter to convert the data to an infra-red signal. An infra-red detector coupled to bus 202 may receive the data carried in the infra-red signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer 102 may also include a communication interface 218 coupled to bus 202. Communication interface 218 provides a two-way data communication coupling to a network link 220 that may be connected to network 112. Network 112 may be a local area network (LAN), wide area network (WAN), or any other network configuration. For example, communication interface 218 may be an integrated services digital network (ISDN) card or a modem to provide a data communication connection to a corresponding type of telephone line. Computer 102 may communicate with a host 224 via network 112. As another example, communication interface 218 may be a local area network (LAN) card to provide a data communication connection to a compatible LAN.

Wireless links may also be implemented. In any such implementation, communication interface 218 sends and receives electrical, electromagnetic or optical signals that carry digital data streams representing various types of information.

Network link 220 typically provides data communication through one or more networks to other data devices. In this embodiment, network 112 may communicate with an Internet Service Provider (ISP) 226. For example, network link 220 may provide a connection to data equipment operated by the ISP 226. ISP 226, in turn, provides data communication services from another server 230 or host 224 to computer 102. Network 112 may use electric, electromagnetic or optical signals that carry digital data streams.

Computer 102 may send messages and receive data, including program code, through network 112, network link 220 and communication interface 218. In this embodiment, server 230 may download an application program to computer 102 via network 112 and communication interface 218. Consistent with the present invention, one such downloaded application geographically maps vulnerability or intrusion information, such as, for example, by executing methods 300 and/or 900, to be described below. The received code may be executed by processor 204 as it is received and/or stored in storage device 210, or other non-volatile storage for later execution.

Although computer system 102 is shown in FIG. 2 as connectable to server 230, those skilled in the art will recognize that computer system 102 may establish connections to multiple servers on Internet 228 and/or network 112. Such servers may include HTML-based Internet applications to provide information to computer system 102 upon request in a manner consistent with the present invention.

Returning to FIG. 1, display 114 may, in one embodiment, be implemented as display 212 (FIG. 2), directly connected to computer 102. In an alternative embodiment, display 114 may be connected to computer 102 via network 112. For example, display 114 may be a display connected to another computer on network 112, or may be a stand-alone display device such as a video projector connected to computer 102 via network 112.

In addition, databases 104, 106, 108, and 110 may each reside within computer 102 or may reside in any other location, such as on network 112, so long as they are in electronic communication with computer 102. In one embodiment, ARP database 106 may be a technical table such as the type typically resident in router points in a computer network, in which information such as the MAC address, IP address and Router (IP/MAC address) is kept.

In one embodiment, location database 108 is a static database in which the physical location of routers or network points is located. Such location information may include router (IP/MAC) address, router (or network point) physical address, and router (or network point) geographic locations, such as GPS coordinates. Accordingly, one of ordinary skill in the art will recognize that ARP database 106 and location database 108 may be kept in accordance with any now known or later developed methods for implementing and maintaining ARP information at router points, or physical location information, respectively.

In an alternative embodiment, databases 104, 106, 108, and 110, may be implemented as a single database, or may be implemented as any number of databases. For example, one of ordinary skill in the art will recognize that system 100 may include multiple ARP databases, such as having one for each router (not shown) in the system. Similarly, system 100 may include multiple vulnerability, location, and map databases. Furthermore, in one embodiment, databases 104, 106, 108, and 110 may be implemented as a single database containing all of the described information. One of ordinary skill in the art will recognize that system 100 may include any number (one or more) of databases so long as the information discussed herein may be retrieved and correlated as discussed herein.

Finally, databases 104, 106, 108, and 110 may be implemented using any now known or later developed database schemes or database software. For example, in one embodiment, each of the databases may be implemented using a relational database scheme, and/or may be built using Microsoft Access™ or Microsoft Excel™ software. While, more likely, one or more databases will be implemented to take into account other factors outside the scope of the present invention (for example, ARP database 106 may require specific format or implementation dependent on the router within which it resides), one of ordinary skill in the art will recognize that any implementation (and location) of the present databases is contemplated within the scope and spirit of the present invention.

Figure 3:
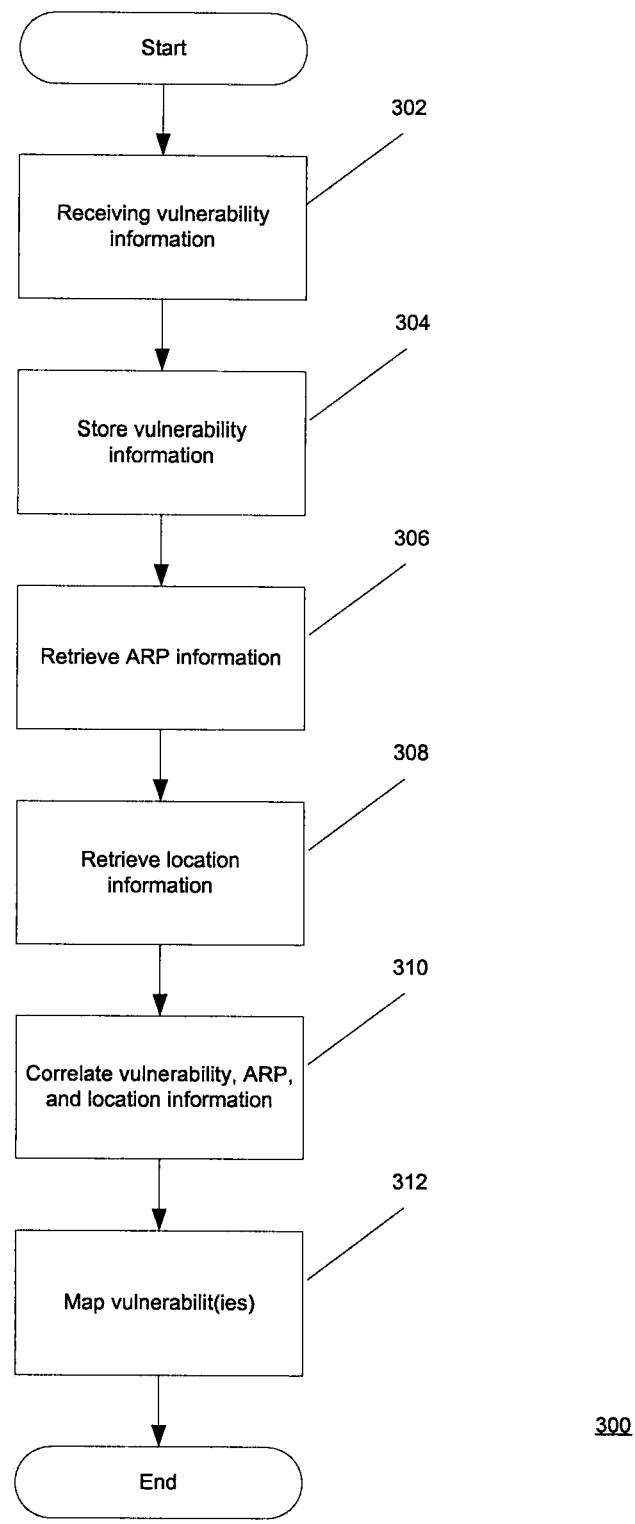
FIG. 3 is a flowchart of an exemplary method for geographically mapping response information.

FIG. 3 shows a method 300 for execution, such as by computer 102, for geographic mapping of vulnerability information, consistent with the present invention. Method 300 begins by receiving vulnerability information, stage 302, such as from a computer administrator, as the output of software designed to detect or discover vulnerabilities, or from any other source. In one embodiment, the vulnerability information, may include an identification (such as the IP address) of the computer where the vulnerability exists, and the name and description of the vulnerability, among other information. Upon receipt of the vulnerability information, it is stored in vulnerability database 104, stage 304. FIG. 4 shows one embodiment of vulnerability information 400 within vulnerability database 104.

Returning to FIG. 3, computer 102 then retrieves for computers (or network points) at which a vulnerability exists, ARP information for that computer (or network point) from ARP database 106, stage 306. In one embodiment, the vulnerability information (such as the IP address) may be used as a key to retrieve the appropriate record from ARP database 106. The ARP information may include the MAC address, and router IP/MAC address or any other network address information of the network point at which the vulnerability exists, as necessary. FIG. 5 shows one exemplary embodiment 500 of the ARP information within ARP database 106.

In addition, computer 102 may also retrieve geographic location information for the computer at which the vulnerability exists, from location database 108, stage 308. In one embodiment, the vulnerability data (such as IP address) and/or the ARP data (such as the router IP/MAC address) may be used as a key to identify a record corresponding to the location database record(s), corresponding to the vulnerable network point. The location information retrieved may include such information as the physical location (e.g., mailing address or GPS coordinates) for the identified vulnerable network point or computer. FIG. 6 shows one exemplary embodiment 600 of the location information within location database 108.

Once this information has been retrieved from databases 104, 106, and 108, it is stored in map database 110, stage 310. Within map database 110, the retrieved information is preferably correlated such that all information for a particular vulnerability is stored in a record for that vulnerable device. For example, FIG. 7 shows an exemplary screenshot 700 of records in map database 110. As shown, map database records 710 may contain the vulnerability information, the network address (such as the IP or MAC address from ARP database 106), and the physical location, such as the mailing address, or GPS information (from location database 108). In addition, map database records 710 may also include a status of the vulnerability and an indication of the response person or team assigned to respond to the vulnerability.

Figure 8:
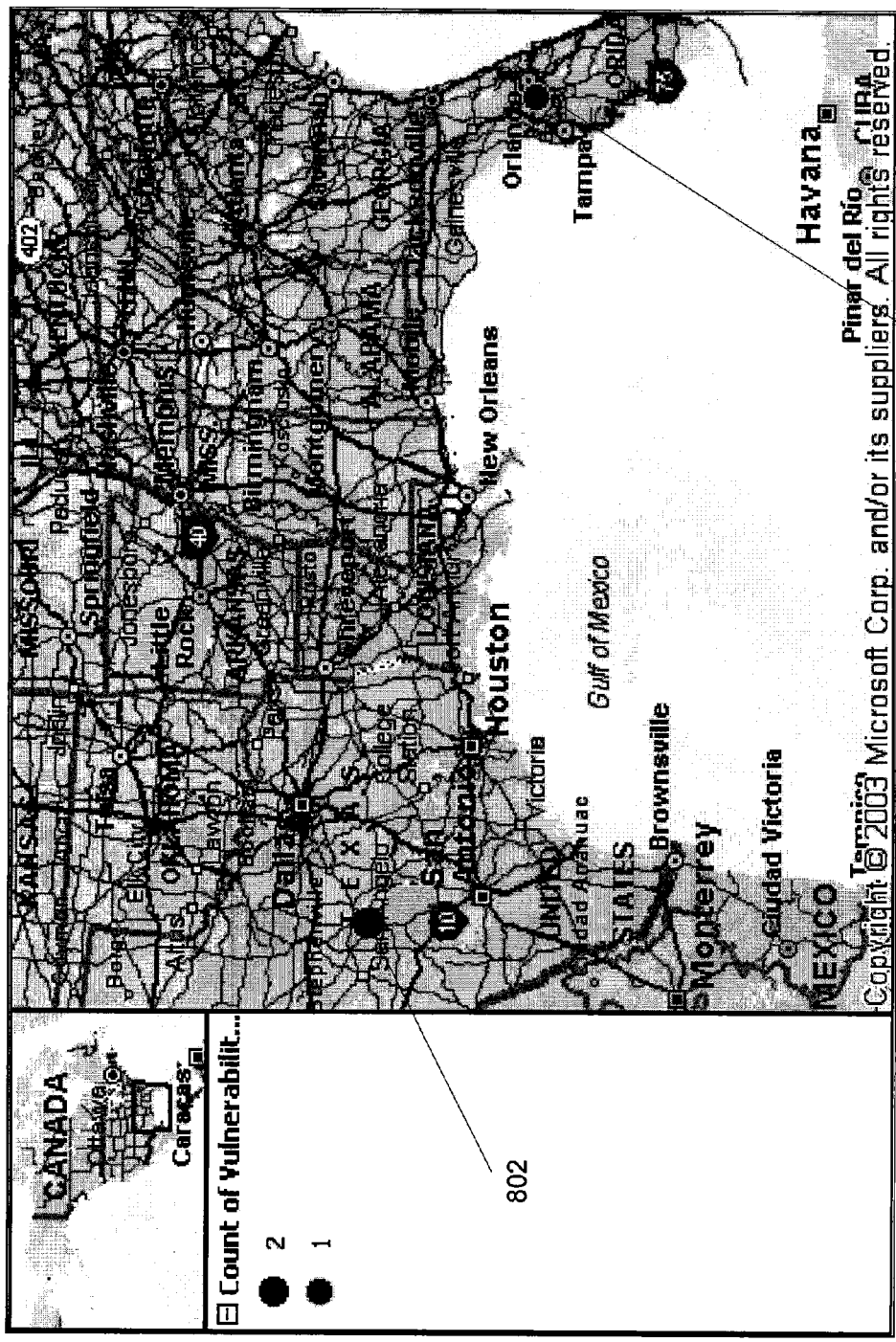
FIG. 8 is an exemplary screenshot of a map geographically mapping vulnerabilities consistent with the present invention.

Upon correlating this information within map database 110, computer 102 then maps the location of the vulnerability, stage 312. In one embodiment, the location information for each record is imported into a commercially available mapping program such as Microsoft Mapppoint™ to visually locate the vulnerable points in the geographical representation of the company on a map. In one embodiment, the map may represent each of the vulnerabilities as a symbol on the map, for example, as a "push pin." An exemplary map 800 using this push pin approach is shown as FIG. 8. Within map 800, each pushpin 802, 804, shows the location of a point of vulnerability requiring a response.

Using map 800, response teams or system administrators will be able to identify "pockets" of vulnerabilities and will be able to better prioritize and more efficiently schedule response personnel to respond and mitigate or eliminate the vulnerability, based on geographic location. For example, the color of the push-pin symbol, or representation on the map, may be used to identify the quantity of vulnerable points in an area on the map, allowing the administrators to identify such "pockets." In addition, the symbol (i.e., push-pin or other symbol) may be linked to the underlying data. In this manner, a system user may, using an input device, select a symbol on the map to initiate a display of data such as the vulnerability type, IP address, status of the response, or other information.

Figure 9:
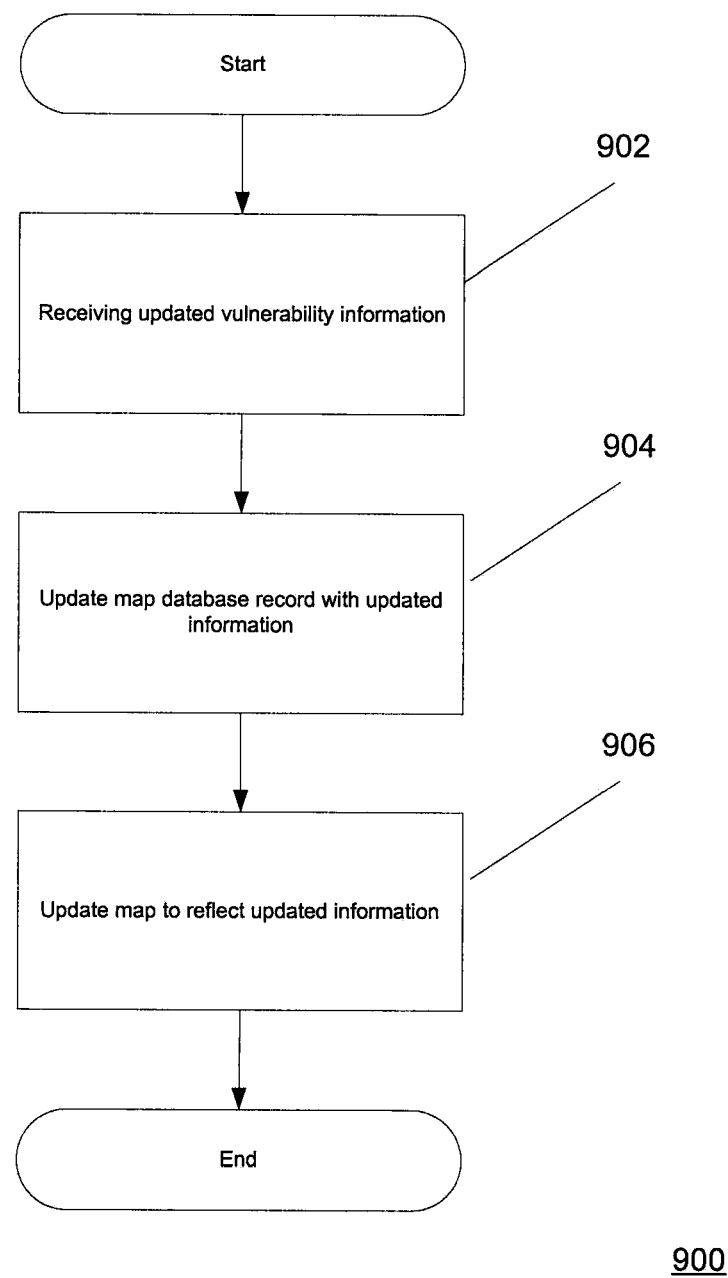
FIG. 9 is a flowchart showing an exemplary method for updating a geographic map with progress information.

FIG. 9 shows a flowchart of a method 900 for updating the geographic map with progress information. Method 900 begins with a response team or system administrator sending an update to the system to advise of a new status of a vulnerability, stage 902. For example, the response team may advise the system that the vulnerable computer must be replaced, and be rendered inactive until it is replaced, (i.e., the vulnerability is "open") or may advise the system that the vulnerable computer has been upgraded and is no longer vulnerable (i.e., the vulnerability if "fixed").

Once this information is received, the map database record for the identified vulnerability is updated, stage 904. For example, each vulnerability record in the database may contain a field to identify the status of the vulnerability (see FIG. 7). Possible status indicators may reflect that the vulnerability is "new," "open" (i.e., not yet responded to), "assigned to a response team," "closed" (i.e., responded to and fixed), or any other status that may be of use to the organization for which the system has been implemented.

Once the map database record has been updated, map computer 102 can update map 800 to reflect the updated status of the vulnerability. For example, one way that map 800 can show the status information is to display color-coded push pin symbols to reflect the status. In one embodiment, a red push pin may signify an "open" or "new" vulnerability, a yellow push pin may signify a vulnerability that has been assigned, but not yet fixed, and a green push pin may signify a closed vulnerability. By mapping this information together with the locations of the vulnerabilities, administrators can better track the progress of their response teams, and more fluidly schedule responses to new vulnerabilities as they arise.

One of ordinary skill in the art will recognize that, while the present invention discusses the systems and methods for mapping vulnerabilities of a system, similar systems and methods may be utilized to map intrusions to the system. For example, referring to FIG. 1, database 104 may maintain intrusion information rather than vulnerability information. Using intrusion database 104, computer 102, through the execution of methods 300 and 900, may geographically map intrusions and update the status of responses to those intrusions, such as is described in U.S. patent application Ser. No. 13/342,146, entitled "Geographical Intrusion Response Prioritization Mapping System," filed concurrently herewith, the contents of which are hereby incorporated by reference in its entirety.

More specifically, with regard to FIG. 3, system 100 may receive intrusion data, stage 302. This information may be received via any source, for example, virus detection software, security software designed to detect unauthorized entry into the system, software designed to identify unauthorized attempts to communicate with a particular port number, or any other now known or later developed method of identifying intrusions.

Once the intrusion information has been received, it is stored in database 104, stage 304. For each intrusion, computer 102 retrieves the ARP information, and location information corresponding to the network point at which the intrusion entered system 100, stages 306 and 308. This information may then be correlated in database 110, (FIG. 3, stage 310). Finally, computer 102 may map the intrusions (FIG. 3, stage 312), and update the map as discussed above (see FIG. 9).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for displaying a vulnerability of a network comprising one or more computers, the method comprising:
   receiving network vulnerability information identifying a vulnerable computer in the network;
   determining a network address of the identified vulnerable computer based on the received network vulnerability information;
   determining a geographical location of the identified vulnerable computer based on the determined network address of the identified vulnerable computer;
   receiving mitigation response status information indicative of a status of a mitigation response to the identified vulnerable computer;
   providing a geographical map including at least the geographical location of the identified vulnerable computer;
   providing a network vulnerability symbol on the map designating the geographical location of the vulnerable computer; and
   graphically distinguishing the network vulnerability symbol on the map to indicate the status of the mitigation response.

2. The method of claim 1, wherein the network vulnerability information includes an Internet Protocol (IP) address associated with the identified vulnerable computer.

3. The method of claim 1, wherein the network address includes at least one of a media access control (MAC) address or a router address associated with the identified vulnerable computer.

4. The method of claim 1, wherein:
   determining a network address includes looking up the network address in a network address database using the received vulnerability information; and
   determining a geographical location includes looking up the geographical location in a geographical location database using the determined network address.

5. The method of claim 1, further including storing, in a map database, a vulnerability record for the identified vulnerable computer, the vulnerability record including the vulnerability information, the network address, the geographical location information, and the mitigation response status information associated with the identified vulnerable computer.

6. The method of claim 1, wherein the status of the mitigation response includes new, open, assigned to a mitigation response team, or closed.

7. The method of claim 1, further including:
receiving new mitigation response status information indicating a new status of the mitigation response; and
updating the network vulnerability symbol on the map to indicate the new status of the mitigation response.

8. A non-transitory computer-readable storage medium storing instructions which, when executed by a computer, cause the computer to perform a method for displaying a vulnerability of a network having one or more network points, the method comprising:
receiving network vulnerability information identifying a vulnerable computer in the network;
determining a network address of the identified vulnerable computer based on the received network vulnerability information;
determining a geographical location of the identified vulnerable computer based on the determined network address of the identified vulnerable computer;
receiving mitigation response status information indicative of a status of a mitigation response to the identified vulnerable computer;
providing a geographical map including at least the geographical location of the identified vulnerable computer;
providing a network vulnerability symbol on the map designating the geographical location of the vulnerable computer; and
graphically distinguishing the network vulnerability symbol on the map to indicate the status of the mitigation response.

9. The computer-readable storage medium of claim 8, wherein the network vulnerability information includes an Internet Protocol (IP) address associated with the identified vulnerable computer.

10. The computer-readable storage medium of claim 8, wherein the network address includes at least one of a media access control (MAC) address or a router address associated with the identified vulnerable computer.

11. The computer-readable storage medium of claim 8, wherein the method further includes:
determining a network address includes looking up the network address in a network address database using the received vulnerability information; and
determining a geographical location includes looking up the geographical location in a geographical location database using the determined network address.

12. The computer-readable storage medium of claim 8, wherein the method further includes storing, in a map database, a vulnerability record for the identified vulnerable computer, the vulnerability record including the vulnerability information, the network address, the geographical location information, and the mitigation response status information associated with the identified vulnerable computer.

13. The computer-readable storage medium of claim 8, wherein the status of the mitigation response includes new, open, assigned to a mitigation response team, or closed.

14. The computer-readable storage medium of claim 8, wherein the method further includes:
receiving new mitigation response status information indicating a new status of the mitigation response; and
updating the network vulnerability symbol on the map to indicate the new status of the mitigation response.

15. A computer-implemented method for representing vulnerabilities of a network comprising a plurality of network points, the method comprising:
receiving, at a computer, network vulnerability information identifying a plurality of vulnerable computers on the network;
determining network addresses of the identified vulnerable computers based on the received network vulnerability information;
determining geographical locations of the identified vulnerable computers based on the determined network addresses of the identified vulnerable computers;
receiving mitigation response status information indicative of statuses of mitigation responses to the identified vulnerable computers;
providing a geographical map including at least the geographical locations of the identified vulnerable computers;
providing network vulnerability symbols on the map designating the geographical locations of the vulnerable computers; and
graphically distinguishing the network vulnerability symbols on the map to indicate the respective statuses of the mitigation responses to the vulnerable computers.

16. The method of claim 15, wherein the network vulnerability information includes Internet Protocol (IP) addresses associated with the identified vulnerable computers.

17. The method of claim 15, wherein the network addresses include at least one of media access control (MAC) addresses or a router addresses associated with the identified vulnerable computers.

18. The method of claim 15, wherein:
determining network addresses includes looking up the network addresses in a network address database using the received vulnerability information; and
determining geographical locations includes looking up the geographical locations in a geographical location database using the determined network addresses.

19. The method of claim 15, further including storing, in a map database, vulnerability records for the identified vulnerable computers, the vulnerability records including the respective vulnerability information, network addresses, geographical location information, and mitigation response status information associated with the identified vulnerable computers.

20. The method of claim 15, wherein the status of the mitigation responses include new, open, assigned to a mitigation response team, or closed.

21. The method of claim 15, further including:
receiving new mitigation response status information indicating a new statuses of the mitigation responses; and
updating the network vulnerability symbols on the map to indicate the new statuses of the mitigation responses.

* * * * *